(12) United States Patent
Chan et al.

(10) Patent No.: US 10,270,627 B2
(45) Date of Patent: Apr. 23, 2019

(54) RECEIVER FOR HIGH SPEED COMMUNICATION CHANNEL

(71) Applicant: eTopus Technology Inc., Sunnyvale, CA (US)

(72) Inventors: Kai Keung Chan, Fremont, CA (US); Danfeng Xu, Cupertino, CA (US); Yu Kou, San Jose, CA (US)

(73) Assignee: eTopus Technology Inc., Sunnyvale, CA (US)

( * ) Notice: Subject to any disclaimer, the term of this patent is extended or adjusted under 35 U.S.C. 154(b) by 0 days.

(21) Appl. No.: 15/069,901

(22) Filed: Mar. 14, 2016

(65) Prior Publication Data

US 2016/0197702 A1     Jul. 7, 2016

Related U.S. Application Data

(63) Continuation of application No. 14/470,759, filed on Aug. 27, 2014, now Pat. No. 9,319,249.

(51) Int. Cl.
    *H04B 1/16*           (2006.01)
    *H04L 25/03*         (2006.01)
                 (Continued)

(52) U.S. Cl.
    CPC ......... *H04L 25/03057* (2013.01); *H04B 1/16* (2013.01); *H04B 10/6161* (2013.01);
                 (Continued)

(58) Field of Classification Search
    CPC . H04L 25/03; H04L 25/03057; H04L 1/0053; H04L 1/0054; H04L 25/03146;
                 (Continued)

(56) References Cited

U.S. PATENT DOCUMENTS

| 4,903,301 A | 2/1990 | Kondo et al. |
| 5,216,697 A | 6/1993 | Ohnuki |

(Continued)

FOREIGN PATENT DOCUMENTS

| CN | 101064512 A | 10/2007 |
| CN | 102202295 A | 9/2011 |

OTHER PUBLICATIONS

Chen, E-H. et al., "Power Optimized ADC-Based Serial Link Receiver," IEEE Journal of Solid-State Circuits, Apr. 2012, pp. 938-951, vol. 47, No. 4.

(Continued)

*Primary Examiner* — Jaison Joseph
(74) *Attorney, Agent, or Firm* — Fenwick & West LLP

(57) ABSTRACT

A receiver for data recovery from a channel signal of a communications channel. The receiver includes a quantization circuit to generate a quantized code corresponding to the channel signal. A first decision circuit recovers, in a first signal processing mode, digital data for the channel signal based on the quantized representation of the channel signal. A second decision circuit recovers, in a second signal processing mode, the digital data for the channel signal based on the quantized representation of the channel signal. A controller selects between the first signal processing mode and the second signal processing mode based on a parameter indicative of a signal quality of the channel signal.

19 Claims, 6 Drawing Sheets

(51) Int. Cl.
*H04B 10/61* (2013.01)
*H04L 1/00* (2006.01)
*H04L 25/06* (2006.01)

(52) U.S. Cl.
CPC .......... *H04L 1/0053* (2013.01); *H04L 1/0054* (2013.01); *H04L 25/03146* (2013.01); *H04L 25/03248* (2013.01); *H04L 25/067* (2013.01); *H04L 2025/03547* (2013.01)

(58) Field of Classification Search
CPC ... H04L 25/03248; H04L 25/067; H04B 1/16; H04B 10/6161
See application file for complete search history.

(56) References Cited

U.S. PATENT DOCUMENTS

| | | | |
|---|---|---|---|
| 5,805,225 A | 9/1998 | Tahara et al. | |
| 6,169,973 B1 | 1/2001 | Tsutsui et al. | |
| 7,848,042 B1* | 12/2010 | Marrow | G11B 5/09 360/25 |
| 8,396,110 B1 | 3/2013 | Hsieh | |
| 2002/0110203 A1* | 8/2002 | Sarkar | H03M 13/03 375/341 |
| 2003/0112891 A1 | 6/2003 | Ozaki | |
| 2003/0223489 A1* | 12/2003 | Smee | H04L 1/188 375/233 |
| 2004/0125874 A1* | 7/2004 | Baumert | H04L 1/205 375/226 |
| 2006/0056496 A1* | 3/2006 | Smee | H04B 1/7115 375/148 |
| 2006/0188043 A1* | 8/2006 | Zerbe | H04L 1/0026 375/346 |
| 2006/0239341 A1 | 10/2006 | Marlett et al. | |
| 2007/0262887 A1* | 11/2007 | Matsuura | H03M 7/165 341/50 |
| 2007/0291886 A1* | 12/2007 | Langenbach | H04L 7/0054 375/371 |
| 2008/0158034 A1* | 7/2008 | Clark | H04B 10/25133 341/155 |
| 2008/0159373 A1* | 7/2008 | Taha | H04B 7/0871 375/232 |
| 2008/0212715 A1* | 9/2008 | Chang | H04L 25/4919 375/317 |
| 2009/0003427 A1* | 1/2009 | Yan | H04L 25/03006 375/232 |
| 2009/0245815 A1* | 10/2009 | Zhang | H04B 10/61 398/208 |
| 2011/0002423 A1* | 1/2011 | Hauske | H04L 7/0054 375/343 |
| 2011/0064421 A1* | 3/2011 | Zhang | H04B 10/6161 398/208 |
| 2011/0110469 A1 | 5/2011 | Liu et al. | |
| 2012/0009888 A1* | 1/2012 | Smadi | H04W 72/1215 455/88 |

OTHER PUBLICATIONS

Parhi, K.K., "Design of Multigigabit Multiplexer-Loop-Based Decision Feedback Equalizers," IEEE Transactions on Very Large Scale Integration (VLSI) Systems, Apr. 2005, pp. 489-493, vol. 13, No. 4.
United States Office Action, U.S. Appl. No. 14/470,759, dated Aug. 14, 2015, 12 pages.
PCT International Search Report and Written Opinion, PCT Application No. PCT/US2015/039809, dated Mar. 25, 2016, 14 pages.
Chinese First Office Action, Chinese Application No. 201580044623.1, dated Jul. 25, 2018, 23 pages.

* cited by examiner

Simple decision

US 10,270,627 B2

RECEIVER FOR HIGH SPEED COMMUNICATION CHANNEL

CROSS REFERENCE TO RELATED APPLICATIONS

This application is a continuation of U.S. application Ser. No. 14/470,759, filed on Aug. 27, 2014, which is incorporated by reference in its entirety.

BACKGROUND

1. Field of the Disclosure

The present disclosure relates to a receiver and, more specifically, to a receiver for recovering data from a high speed communication channel.

2. Description of the Related Art

In high speed communication systems, a transmitting device transmits data across a high speed communication channel to a receiving device. The receiving device receives an analog channel signal from the communication channel that represents the transmitted data. The channel signal can be affected by channel impairments, such as insertion loss, crosstalk and optical dispersion. To account for such impairments, the receiving device uses signal processing techniques to recover data from the channel signal. However, recovering data using traditional signal processing techniques can consume a significant amount of power, which is problematic when power is limited (e.g., energy efficient data center or in a mobile device).

SUMMARY

Embodiments of the present disclosure include a receiver that operates in different signal processing modes depending on the signal quality of a channel signal, which reduces power consumption. In one embodiment, disclosed is a receiver for data recovery from a channel signal of a communications channel. The receiver comprises a quantization circuit to generate a quantized code corresponding to the channel signal. A first decision circuit recovers, in a first signal processing mode, digital data for the channel signal based on the quantized representation of the channel signal. A second decision circuit recovers, in a second signal processing mode, the digital data for the channel signal based on the quantized representation of the channel signal. A controller selects between the first signal processing mode and the second signal processing mode based on a parameter indicative of a signal quality of the channel signal.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the embodiments of the present disclosure can be readily understood by considering the following detailed description in conjunction with the accompanying drawings.

DETAILED DESCRIPTION OF EMBODIMENTS

The Figures (FIG.) and the following description relate to preferred embodiments of the present disclosure by way of illustration only. Reference will now be made in detail to several embodiments of the present disclosure, examples of which are illustrated in the accompanying figures. It is noted that wherever practicable similar or like reference numbers may be used in the figures and may indicate similar or like functionality. One skilled in the art will readily recognize from the following description that alternative embodiments of the structures and methods illustrated herein may be employed without departing from the principles of the disclosure described herein.

Embodiments of the present disclosure include a receiver that operates in different signal processing modes depending on the signal quality of a received channel signal, which reduces power consumption. The signal processing modes can include a high power signal processing mode during which advanced signal processing functions are turned on and a low power signal processing mode during which advanced signal processing functions are disabled. The receiver selects between the modes depending on the signal quality of the channel signal.

Figure 1:
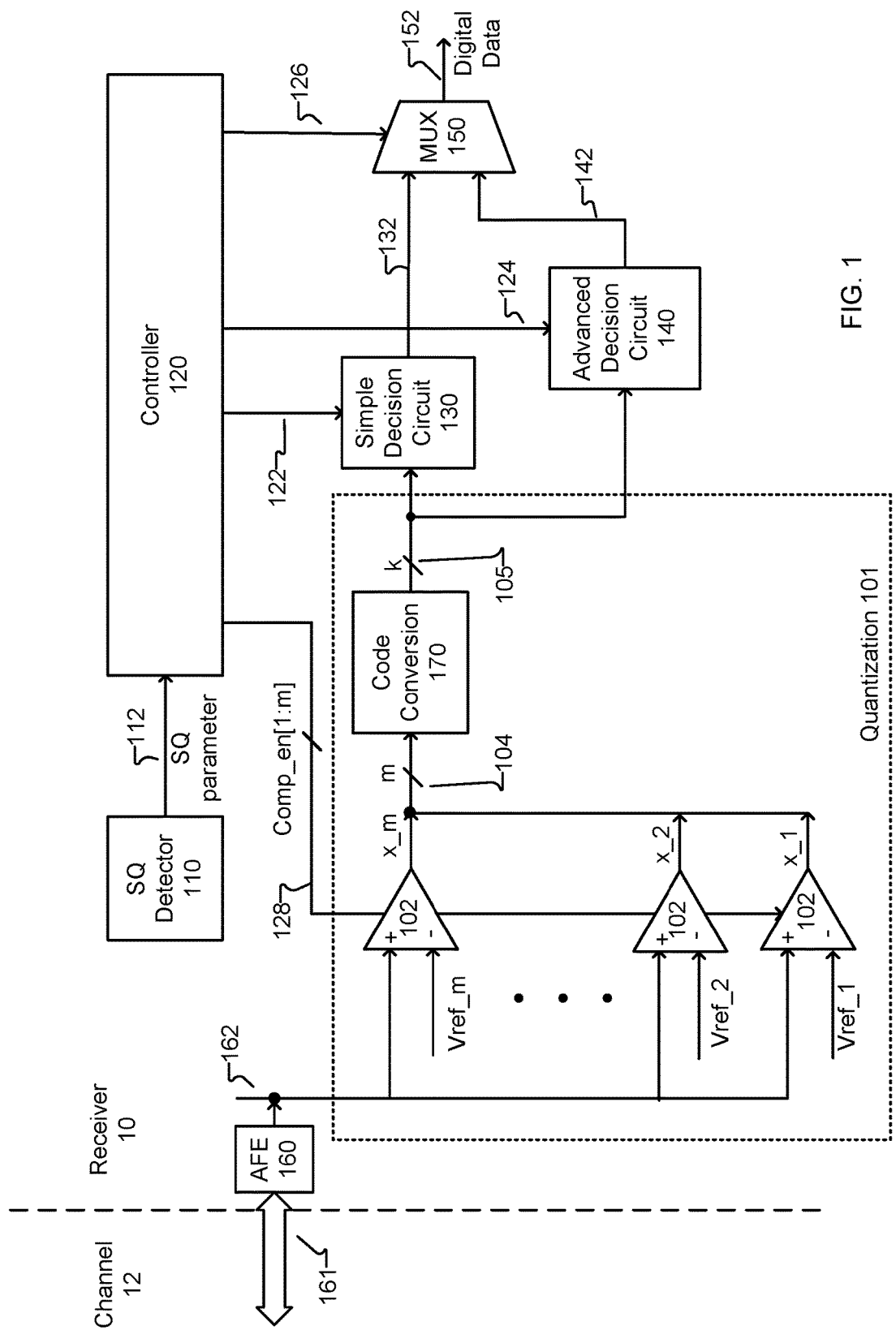
FIG. 1 is a high speed communication system that includes a receiver, according to an embodiment.

FIG. 1 is a high speed communication system that includes a receiver 10, according to an embodiment. The receiver 10 is coupled to a communications channel 12 and receives a channel signal 161 from a remote transmitter (not shown) through the communications channel 12. The communications channel 12 can be, for example, a copper communication channel found in a computing backplane that carries single ended or differential signals. The communications channel 12 can also be, for example, an optical communication channel that carries optical signals.

The channel signal 161 received across the channel 12 represents digital data transmitted by the remote transmitting device. The receiver 10 recovers the digital data from the channel signal 161 and generates a digital data output 152 representing the estimated digital value of the channel signal 161. In some embodiments, the receiver 10 may be a part of a larger device, such as an application specific integrated circuit (ASIC). As shown, the receiver 10 includes an analog front end 160, a quantization circuit 101, a code conversion circuit 170, a signal quality detector 110, a controller 120, a simple decision circuit 130, an advanced decision circuit 140, and a multiplexer 150. In one embodiment, each of these components can be implemented with hardware circuits.

The analog front end 160 performs pre-processing on the channel signal 161 using analog processing techniques to generate an analog input signal 162. Examples of analog processing techniques include gain adjustment, continuous time equalization filter, or analog finite impulse response equalization. The analog input signal 162 has an analog voltage level that generally corresponds to the level of the channel signal 161, and may include changes introduced by the AFE. The channel signal 161 may be non-ideal due to channel impairments, such as insertion loss, crosstalk, inter-symbol interference and optical dispersion, and many of these non-idealities are still reflected in the analog input signal 162. In other embodiments the analog front end 160 may simply be an input terminal that receives the channel signal 161.

The quantization circuit 101 quantizes the analog input signal 162 into a quantized digital input code 105. Quantized input code 105 is a k bit digital value that is a quantized representation of the analog signal level of a sample of the channel signal 161 (via analog input signal 162). Quantization rounds an analog voltage to a closest one of several possible quantization levels. The quantization is performed for different samples of analog input signal 162 to generate a series of digital input codes 104. The quantization circuit 101 can be viewed as an analog to digital converter (ADC) that converts an analog voltage into its closest digital value.

The quantization circuit 101 includes m comparators 102 and a code conversion circuit 170. Each of the comparators 102 receives the analog input signal 162 and compares the analog input signal 162 to respective reference voltages Vref_1 through Vref_m. The reference voltages Vref increase in voltage level from Vref_1 to Vref_m (e.g., Vref_1 has the lowest voltage level and Vref_m has the highest voltage level).

The output signals of the comparators 102 form a m bit digital thermometer code 104 (also known as a unary code). As a simple example, voltage levels of the analog input signal 162 may be quantized and mapped into a 4 bit thermometer code 104 as follows:

0V to 0.1 V→0000
0.1V to 0.2V→0001
0.2V to 0.3V→0011
0.3V to 0.4V→0111
0.4V to 0.5V→1111

This particular quantization mapping includes 0.1V quantization steps. In other embodiments, the size of the quantization steps may be different, and there may be a greater number of quantization levels (e.g. 64 quantization levels).

The code conversion circuit 170 then performs thermometer to binary conversion on a series of thermometer codes 104 to generate a series of quantized input codes 105. The code conversion circuit 170 includes combinational logic that converts the thermometer code 104 having m bits into a binary code having k bits. For example, the combinational logic can convert an 8 bit thermometer code of 00000011 into a 3 bit binary code of 010. The binary code is used as the quantized input code 105. In other embodiments, the thermometer code 104 may be used as the quantized input code 105 without a code conversion circuit 170.

The simple decision circuit 130 receives the quantized input code 105 and recovers the data being transferred by the channel signal 161 from the quantized input code 105. Specifically, the decision circuit 130 makes a decision about which logical value (i.e. 0 or 1) the quantized input code 105 represents. The simple decision circuit 130 then outputs digital data 132 representing the estimated logical value of data being transferred by the channel signal 161. The simple decision circuit 130 implements simple signal processing algorithms that consume very little power and are capable of accounting for only minor channel impairments. An example of the simple decision circuit 130 is an adaptive equalizer, such as a decision feedback equalizer (DFE), that accounts for inter symbol interference when recovering data from the quantized input code 105.

Similarly, the advanced decision circuit 140 receives the quantized input code 105 and recovers the data being transferred by the channel signal 161 from the quantized input code 105. Specifically, the advanced decision circuit 140 makes a decision about which logical value (i.e. 0 or 1) the quantized input code 105 represents. The advanced decision circuit 140 then outputs digital data 142 indicating the estimated logical value of data being transferred by the channel signal 161.

The advanced decision circuit 140 typically implements advanced signal processing algorithms that consume more power than the simple decision circuit 130, but are also capable of recovering data when channel impairments are significant and signal quality is low. In one embodiment, the advanced decision circuit 140 includes a digital signal processor (DSP) that receives the quantized input code 105 and applies advanced digital signal processing techniques in order to recover data from the quantized input code 105. Examples of such algorithms include a finite impulse response (FIR) filter, maximum likelihood sequence detector (MLSD) (e.g., a Viterbi decoder), or other advanced signal processing algorithms.

The simple decision circuit 130 and advanced decision circuit 140 are parallel and alternative paths for recovering data from the quantized input code 105. In one embodiment, digital data 132 and digital data 142 are one bit binary codes (e.g., 0 or 1). In other embodiments, the digital data 132 and digital data 142 may be multi-bit binary codes. The multiplexer 150 is coupled to the outputs of both the simple decision circuit 130 and advanced decision circuit 140. The multiplexer 150 selects either digital data 132 or digital data 142 as the final digital data output 152. The multiplexer 150 selects between digital data 132 or digital data 142 depending on the state of a mode selection signal 126.

The signal quality detector 110 determines the signal quality of the channel signal 161 and generates a signal quality parameter 112 that indicates a level of the signal quality of the channel signal 161. The signal quality parameter 112 can indicate that signal quality is low if there are significant channel impairments, and can indicate that signal quality is high if there are no channel impairments. Techniques for generating the signal quality parameter 112 will be explained in greater detail by reference to FIGS. 3 and 4.

The controller 120 receives the signal quality parameter 112 and uses the signal quality parameter 112 to select between the simple decision circuit 130 and the advanced decision circuit 140. Specifically, the controller 120 compares the signal quality parameter 112 to a threshold signal quality level. If the signal quality is below the threshold (i.e. low signal quality), the controller 120 operates the receiver 10 in a high power signal processing mode by turning off the simple decision circuit 130 through signal 122 and turning on the advanced decision circuit 140 through signal 124. The controller 120 also uses selection signal 126 to select digital data 142 for generating the final digital data output 152. By contrast, if the signal quality is above the threshold (i.e. high signal quality), the controller 120 operates the receiver 10 in a low power signal processing mode by turning on the simple decision circuit 130 and turning off the advanced decision circuit 140. The controller 120 also selects digital data 132 for generating the final digital data output 152.

The controller 120 thus operates the receiver 10 in either a low power signal processing mode or a high power signal processing mode. In the low power mode, when signal quality is high, the advanced decision circuit 140 is turned off because it is not needed. In the high power mode, when signal quality is low, the advanced decision circuit 140 is turned on because the simple decision circuit 130 cannot properly recover the data. Selectively operating the advanced decision circuit 140 on an as-needed basis helps reduce the overall power consumption of the receiver 10 without affecting accuracy of the receiver 10.

In one embodiment, turning on/off a circuit can include enabling or disabling the circuit, gating a clock of the circuit, removing a source of power from the circuit, gating the power source of the section of circuit not used, or other techniques for turning on/off a circuit that reduce power consumption.

Additionally, when signal quality is high, the controller 120 can further reduce power consumption by selectively turning off some of the comparators 102 via comparator enable signals 128. Turning off the comparators 102 increases the size of the quantization steps and decreases the resolution of the quantized input code 105. For example, if there are 64 comparators 102, half of the comparators 102 may be turned off, which results in only 32 active comparators 102. This saves power, but also results in less accurate quantized input code 105 being provided to the simple decision circuit 130. However, when signal quality is high, the simple decision circuit 130 may still be able to recover data from a less accurate quantized input code 105.

Figure 2A:
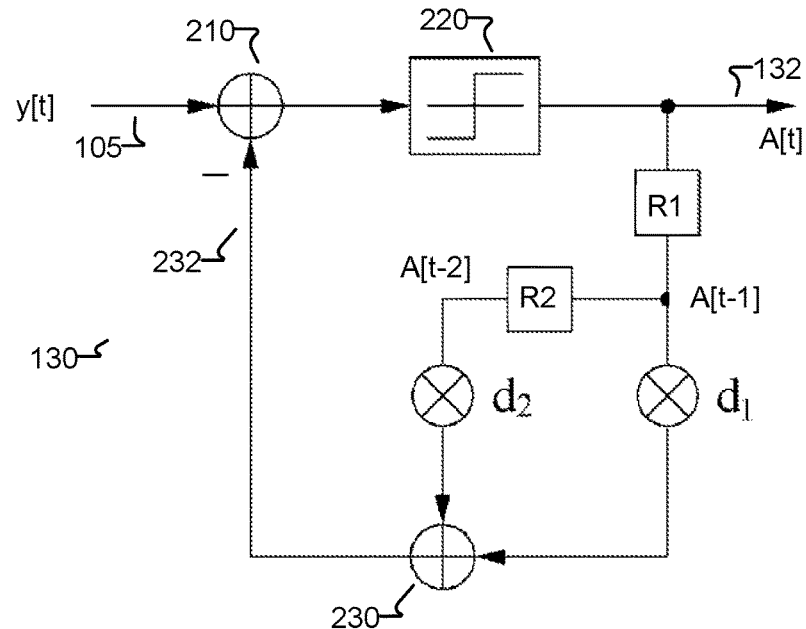
FIG. 2A is a detailed view of a simple decision circuit, according to an embodiment.

FIG. 2A is a detailed view of a simple decision circuit 130, according to an embodiment. This simple decision circuit 130 is a DFE that feeds back decisions about past data decisions to influence decisions about future data decisions, which reduces ISI effects. The simple decision circuit 130 receives the quantized input code 105, where y[t] represents the quantized input code 105 at time t. A combining circuit 210 combines the quantized input code 105 with a feedback value 232. A thresholding circuit 220 compares the outputs of the combiner circuit 210 to a threshold and outputs digital data 132 having a value that depends on whether the threshold is exceeded. A[t] represents the digital data value 132 at time t, where A[t] can be a logical 1 or logical −1.

A feedback loop generates the feedback value 232. The digital data value 132 is stored in a register R1, which is propagated to the next register R2 at the next sampling time. The value of register R1, which is A[t−1], is weighted by weight $d_1$. The value of register R2, which is A[t−2], is weighted by weight $d_1$. Combiner 230 combines the two weighted values to form the feedback value 232.

Figure 2B:
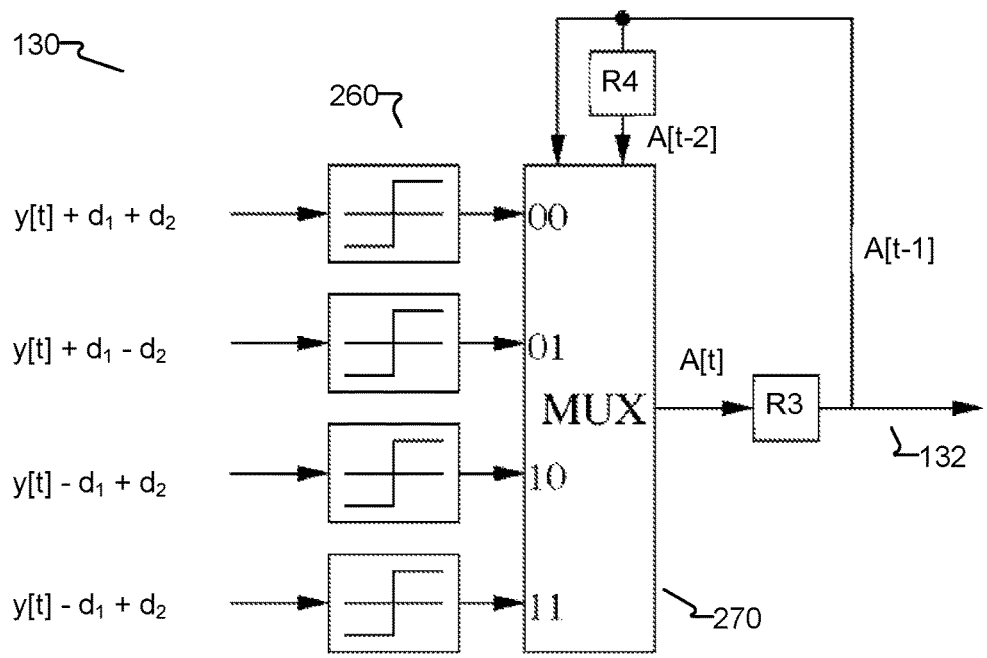
FIG. 2B is a detailed view of a simple decision circuit, according to another embodiment.

FIG. 2B is a detailed view of a simple decision circuit 130, according to another embodiment. The simple decision circuit 130 of FIG. 2B is a multiplexer based DFE that pre-computes all possible data outputs and selects the correct data output for the digital data value 132. The multiplexer DFE of FIG. 2B has higher bandwidth than the DFE of FIG. 2A and may be appropriate for higher speed channels.

Specifically, quantized input code 105 at time t (i.e. y[t]) is combined with different possibilities of weights $d_1$ and $d_2$. The thresholding circuits 260 compare the possible combinations to a threshold and output digital values that depend on whether the threshold is exceeded. A multiplexer 270 selects one of the four possible outputs from the thresholding circuits 260 to output as digital data value A[t]. Digital data value A[t] is stored in register R3. The output of register R3 is digital data value A[t−1], which is stored in register R4. Digital data value A[t−1] is also used as the digital data output 132 of the simple decision circuit 130. The output of registers R3 and R4 form MUX select signals that are used by the MUX 270 to select one of the four possible outputs from the thresholding circuits 260.

Figure 3:
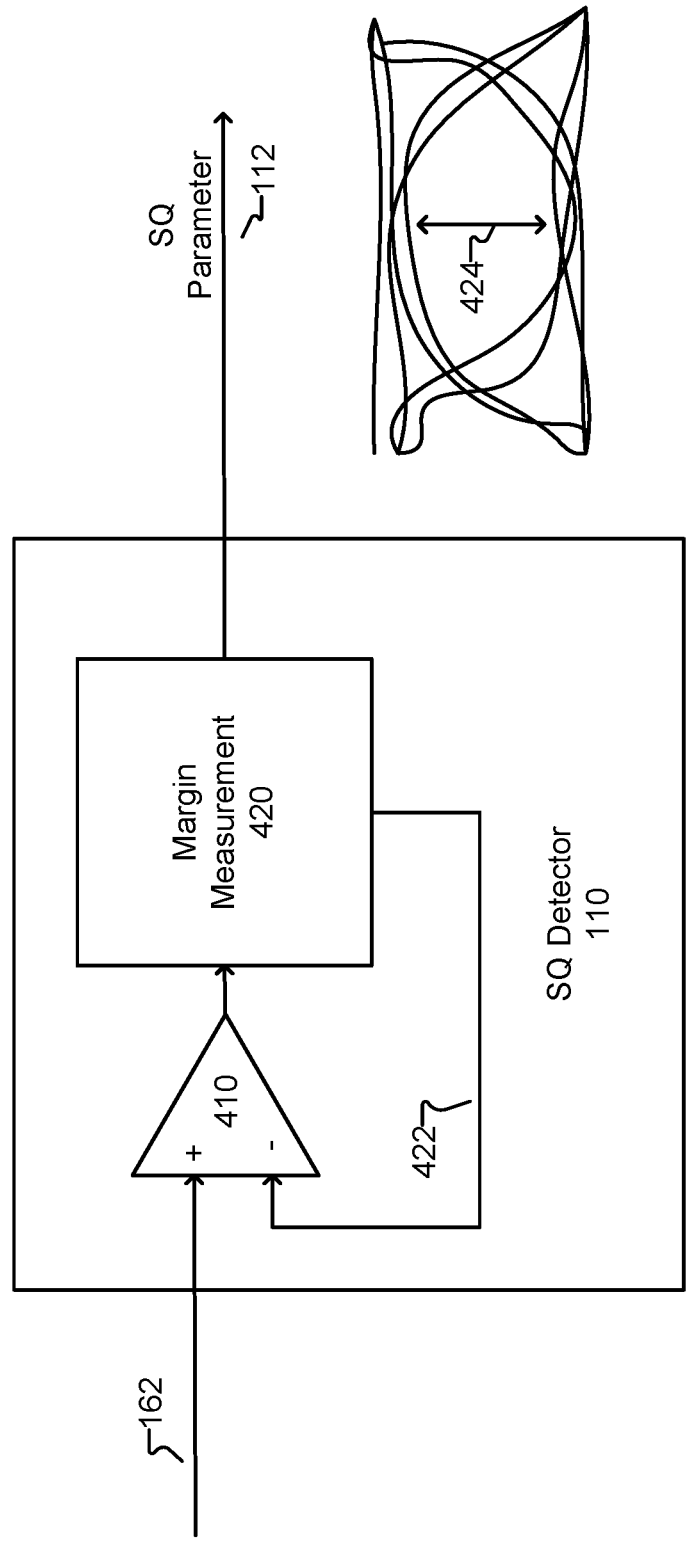
FIG. 3 is a detailed view of a signal quality detector, according to an embodiment.

FIG. 3 is a detailed view of a signal quality detector 110, according to an embodiment. The signal quality detector 110 includes a comparator 410 and margin measurement logic 420. The comparator 410 has a positive input, receiving the analog input signal 162 and a negative input receiving a reference voltage 422. The analog input signal 162 is compared to the reference voltage 422. For a particular time sample of the analog input signal 162, the reference voltage 422 is swept until the output of the comparator 410 changes. The level of the reference voltage 422 is then stored as the level of the analog input signal 162. This process is repeated many times over a period of time to accumulate data that represents a waveform of the channel signal 161.

The margin measurement logic 420 then measures a vertical eye opening 424 of the waveform from the accumulated data. The size of the vertical eye opening 424 corresponds to the signal quality of the channel signal 161 and is output as the signal quality parameter 112. The controller 120 can then compare the vertical eye opening 424 to a threshold to determine which decision circuit (130 or 140) to use.

Figure 4:
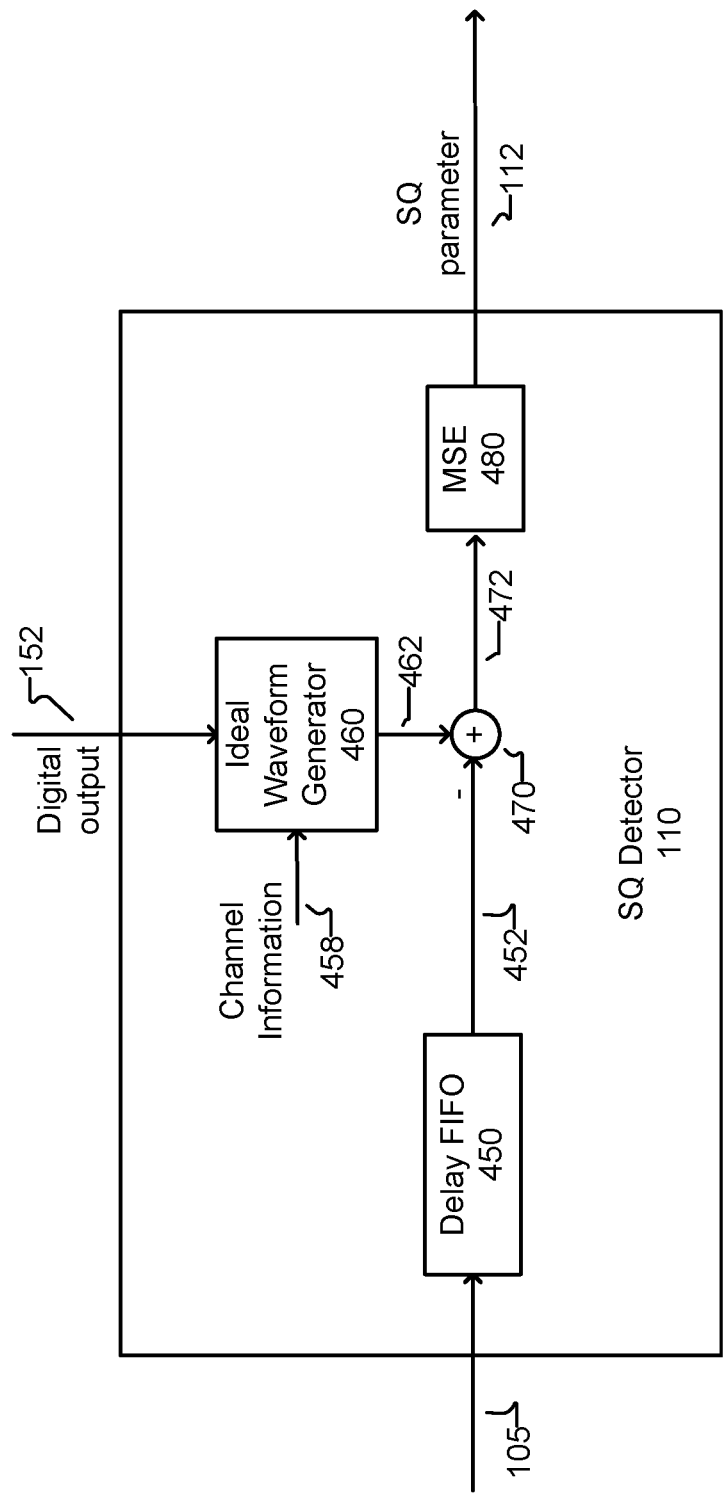
FIG. 4 is a detailed view of a signal quality detector, according to another embodiment.

FIG. 4 is a detailed view of a signal quality detector 110, according to another embodiment. The signal quality detector 110 includes a delay first-in-first out (FIFO) circuit 450, an ideal waveform generator 460, an error comparator 470, and a mean square error estimator 480.

The delay FIFO circuit 450 receives the quantized input code 105 and temporarily stores the quantized input code 105 in a FIFO queue. After some amount of time, the delay FIFO circuit 450 outputs a delayed version 452 of the quantized input code 105

The ideal waveform generator 460 receives the final digital data output 152 representing data recovered from the channel signal 161. The ideal waveform generator 460 also receives channel information 458 describing characteristics of the communications channel 12. For example, the characteristics may be part of a channel model and include the sampled pulse response of the channel 12 over time. The ideal waveform generator 460 uses the final digital output 152 and channel information 458 to reconstruct an ideal channel waveform. The ideal channel waveform is an ideal shape of the channel signal 161 when transferring the data through a channel 12 having the channel characteristics. The ideal waveform generator 460 then outputs ideal waveform data 462 for the ideal channel waveform.

The error comparator 470 compares the delayed input code 452 (which represents the actual channel waveform) to the ideal waveform data 462. The error comparator 470 outputs error information 472 representing a difference between the ideal waveform represented by the ideal waveform data 462 and the actual channel waveform represented by the delayed digital input code 452.

The mean square error (MSE) estimator 480 accumulates the error information 472 over a length of time and calculates a MSE of the accumulated error information. The MSE represents a statistical deviation between the ideal waveform and the actual waveform of the channel signal 161, and provides a reliable indication of the signal quality of the channel signal 161. The MSE is then output as the signal quality parameter 112.

Figure 5:
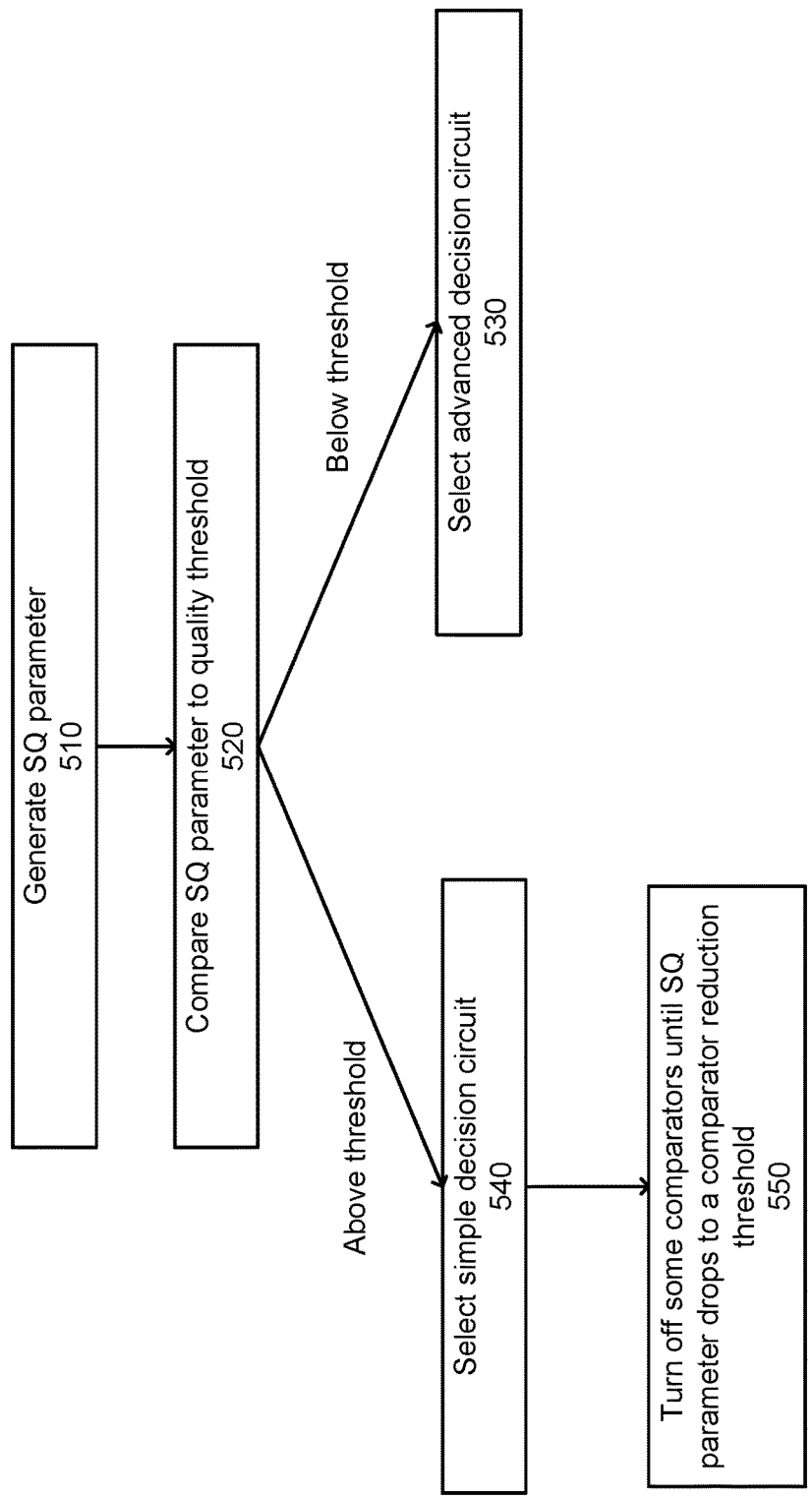
FIG. 5 is a flowchart of a method of operation in a receiver, according to an embodiment.

FIG. 5 is a flowchart of a method of operation in a receiver 10, according to an embodiment. In step 510, a signal quality parameter 112 is generated. The signal quality parameter 112 indicates the signal quality of the channel signal 161. In step 520, the signal quality parameter 112 is compared to a quality threshold level.

In step 530, if the signal quality parameter 112 is below the quality threshold level, the advanced decision stage 140 is selected and turned on to process quantized input code 105. The simple decision stage 130 is turned off as it is not needed. This is a high power signal processing mode.

In step 540, if the signal quality parameter 112 is above the threshold, the advanced decision stage 130 is selected and turned on to process quantized input code 105. The advanced decision stage 140 is turned off as it is not needed. This is a low power signal processing mode.

In step 550, some of the comparators 102 can be turned off to further save power. In one embodiment, the signal quality parameter 112 is generated using the signal quality detection circuit 110 shown in FIG. 5B. Turning off comparators 102 tends to reduce the accuracy of the final digital data output 152, which is reflected in a lower signal quality parameter 112. The signal quality parameter 112 is analyzed each time some comparators 102 are turned off. Additional comparators 102 are turned off until the signal quality parameter 112 drops below a comparator reduction threshold level, which is typically higher than the quality threshold level used to select between different power signal processing modes.

Figure 6:
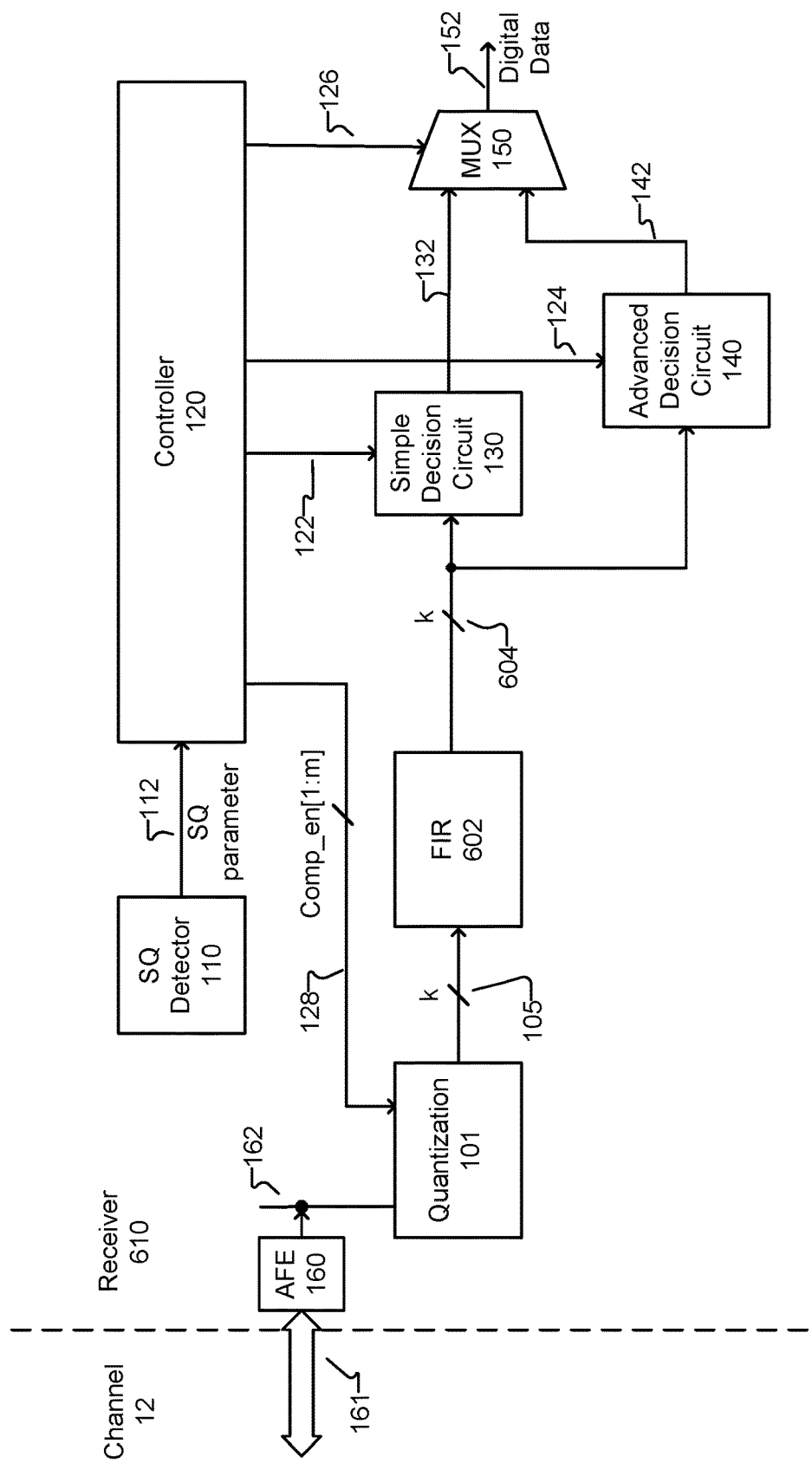
FIG. 6 is a high speed communication system that includes a receiver, according to another embodiment.

FIG. 6 is a high speed communication system that includes a receiver 610, according to another embodiment. The receiver 610 is similar to receiver 10, but now includes a digital finite impulse response (FIR) filter 602. FIR filter 602 receives the quantized input code 105 and generates a filtered digital input code 604 that is the weighted sum of current and past quantized input codes 105. The filtered digital input code 604 is then provided to the simple decision circuit 130 and the advanced decision circuit 140.

Additionally, in one embodiment, the controller 120 may use the signal quality parameter 112 to monitor a failure in the channel 12. For example, the controller 120 may compare the signal quality parameter 112 to a failure threshold. The failure threshold is set to be extremely low, and is below the quality threshold used to select between different power signal processing modes. This failure threshold is only triggered in the event of a complete failure in the channel 12, which can be caused, for example, by bent optical fibers. The controller 120 may determine the channel has failed if the signal quality parameter 112 falls below the threshold and initiate failure recovery services.

In one embodiment, a representation of the receiver 10 or 610 or components within the receiver 10 or 610 may be stored as data in a non-transitory computer-readable medium (e.g. hard disk drive, flash drive, optical drive). These representations may be behavioral level, register transfer level, logic component level, transistor level and layout geometry-level descriptions.

Upon reading this disclosure, those of ordinary skill in the art will appreciate still additional alternative structural and functional designs for a receiver for high speed communications through the disclosed principles of the present disclosure. Thus, while particular embodiments and applications of the present disclosure have been illustrated and described, it is to be understood that the disclosure is not limited to the precise construction and components disclosed herein. Various modifications, changes and variations which will be apparent to those skilled in the art may be made in the arrangement, operation and details of the method and apparatus of the present disclosure disclosed herein without departing from the spirit and scope of the disclosure as defined in the appended claims.

What is claimed is:

1. A receiver for data recovery, comprising:
a circuit to couple to one of a copper communications channel or an optical communications channel, the circuit to receive a channel signal from the one of the copper communications channel or the optical communications channel and to output an analog input signal based on the channel signal;
an analog to digital converter to quantize the analog input signal into at least one quantized code and to generate at least one signal indicative of the at least one quantized code;
a finite impulse response filter to generate at least one signal indicative of at least one filtered code based on the at least one signal indicative of the at least one quantized code;
a first decision circuit to recover, in a first signal processing mode, digital data based on the at least one signal indicative of the at least one filtered code;
a second decision circuit to recover, in a second signal processing mode, the digital data based on the at least one signal indicative of the at least one filtered code; and
a controller circuit to select between the first signal processing mode and the second signal processing mode based on a parameter indicative of a signal quality of the channel signal that was received by the circuit from the copper communications channel or the optical communications channel.

2. The receiver of claim 1, wherein the controller circuit turns off the second decision circuit when selecting the first signal processing mode.

3. The receiver of claim 2, wherein the first decision circuit recovers the digital data using a first signal processing algorithm and the second decision circuit recovers the digital data using a second signal processing algorithm that is distinct from the first signal processing algorithm, and the second signal processing algorithm consumes more power than the first signal processing algorithm of the first decision circuit when recovering the digital data.

4. The receiver of claim 1, wherein the first decision circuit includes a decision feedback equalizer (DFE).

5. The receiver of claim 4, wherein the second decision circuit implements a Viterbi algorithm to recover, in the second signal processing mode, the digital data.

6. The receiver of claim 1, wherein the controller circuit compares the signal quality parameter to a quality threshold and selects between the first mode and the second mode based on the comparison.

7. The receiver of claim 6, wherein the controller circuit selects the first mode responsive to the signal quality parameter being greater than a threshold signal quality level and wherein the controller selects the second mode responsive to the signal quality parameter being less than the threshold signal quality.

8. The receiver of claim 1, further comprising:
a signal quality detection circuit to generate the parameter indicative of the signal quality of the channel signal.

9. The receiver of claim 8, wherein the parameter indicative of the signal quality is a parameter indicative of a vertical eye opening of the channel signal.

10. The receiver of claim 8, wherein the signal quality detection circuit receives the digital data for the channel signal and generates the parameter indicative of the signal quality of the channel signal based on the digital data for the channel signal.

11. The receiver of claim 8, wherein the signal quality detection circuit receives at least one signal indicative of the at least one quantized code and generates the parameter indicative of the signal quality of the channel signal based on the at least one signal indicative of the at least one quantized code.

12. The receiver of claim 8, wherein the signal quality detection circuit generates the parameter indicative of the signal quality of the channel signal based on channel information describing characteristics of the one of the copper communications channel or the optical communications channel.

13. The receiver of claim 8, wherein the signal quality detection circuit generates the parameter indicative of the signal quality of the channel signal based on a mean squared error calculation of a difference between an ideal version of the channel signal and an actual waveform of the channel signal.

14. The receiver of claim 1, wherein the at least one filtered code is a summation of a current quantized code and one or more previous quantized codes.

15. The receiver of claim 1, wherein the controller circuit further compares the parameter indicative of the signal quality of the channel signal to a failure threshold, and determines that the one of the copper communications channel or the optical communications channel has failed responsive to the comparison.

16. The receiver of claim 1, further comprising:
a multiplexer coupled to an output of the first decision circuit and an output of the second decision circuit,
wherein the controller circuit controls the multiplexer to select the output of the first decision circuit in the first signal processing mode and to select the output of the second decision circuit in the second signal processing mode.

17. A method of operation in a receiver for data recovery, the method comprising:
receiving a channel signal from one of a copper communications channel or an optical communications channel and generating an analog input signal based on the channel signal;
quantizing the analog input signal into at least one quantized code and generating at least one signal indicative of the at least one quantized code;
filtering, with a finite impulse response filter, the at least one signal indicative of the at least one quantized code to generate at least one signal indicative of at least one filtered code;
recovering, with a first decision circuit in a first signal processing mode, digital data for the channel signal based on the at least one signal indicative of at least one filtered code;
recovering, with a second decision circuit in a second signal processing mode, the digital data for the channel signal based on the at least one signal indicative of the at least one quantized code; and
selecting between the first signal processing mode and the second signal processing mode based on a parameter indicative of a signal quality of the channel signal that was received by the circuit from the copper communications channel or the optical communications channel.

18. A non-transitory computer readable medium storing a representation of a receiver for data recovery, the receiver comprising:
a circuit to couple to one of a copper communications channel or an optical communications channel, the circuit to receive a channel signal from the one of the copper communications channel or the optical communications channel and to output an analog input signal based on the channel signal;
an analog to digital converter to quantize the analog input signal into at least one quantized code and to generate at least one signal indicative of the at least one quantized code;
a finite impulse response filter to generate at least one signal indicative of at least one filtered code based on the at least one signal indicative of the at least one quantized code;
a first decision circuit to recover, in a first signal processing mode, digital data based on the at least one signal indicative of the at least one filtered code;
a second decision circuit to recover, in a second signal processing mode, the digital data based on the at least one signal indicative of the at least one filtered code; and
a controller circuit to select between the first signal processing mode and the second signal processing mode based on a parameter indicative of a signal quality of the channel signal that was received by the circuit from the copper communications channel or the optical communications channel.

19. The receiver of claim 8, wherein the signal quality detection circuit comprises:
an ideal waveform generator circuit to receive the digital data and channel information describing characteristics of the copper communications channel or the optical communications channel, and to generate data corresponding to an ideal waveform of the channel signal based on the digital data and the channel information describing characteristics of the copper communications channel or the optical communications channel;
a comparator circuit to compare the at least one quantized code to the data corresponding to the ideal waveform of the channel signal and to generate error information indicative of a difference between the at least one quantized code and the data corresponding to the ideal waveform of the channel signal; and
a mean squared error estimation circuit to generate the parameter indicative of the signal quality of the channel signal based on a mean squared error calculation of the error information.

* * * * *